United States Patent [19]

Glaister

[11] 3,715,329

[45] Feb. 6, 1973

[54] HEAT VULCANIZABLE POLYSILOXANE COMPOSITIONS CONTAINING ASBESTOS

[75] Inventor: Frank J. Glaister, Ballston Spa, N.Y.

[73] Assignee: General Electric Company, Waterford, N.Y.

[22] Filed: April 15, 1971

[21] Appl. No.: 134,438

[52] U.S. Cl. ...........................260/37 SB, 260/46.5 G
[51] Int. Cl. ..........................C08g 51/10, C08g 31/02
[58] Field of Search.........260/37 SB, 46.5 R, 46.5 G, 260/827

[56] References Cited

UNITED STATES PATENTS

| | | | |
|---|---|---|---|
| 3,377,311 | 4/1968 | Roch | 260/37 SB |
| 3,453,228 | 7/1969 | Metevia et al. | 260/37 SB |
| 2,546,474 | 3/1951 | Peyret et al. | 260/37 SB UX |
| 2,860,074 | 11/1958 | Hellund | 260/827 X |
| 3,577,264 | 5/1941 | Nordstrom | 260/827 X |
| 3,575,910 | 4/1971 | Thomas | 260/827 X |

FOREIGN PATENTS OR APPLICATIONS

| | | | |
|---|---|---|---|
| 1,360,046 | 12/1964 | France | 260/37 SB |

*Primary Examiner*—Lewis T. Jacobs
*Attorney*—Donald J. Voss, E. Philip Koltos, Frank L. Neuhauser, Oscar B. Waddell and Joseph B. Forman

[57] ABSTRACT

A heat vulcanizable silicone rubber composition comprising 5 to 94.47 percent by weight of an organopolysiloxane polymer, 5 to 75 percent by weight of an asbestos filter, and 0.25 to 10 percent by weight of an acrylic ester. The composition also includes a silica filler, a peroxide curing catalyst and a process aid. The preferred acrylic ester are methyl acrylate and trimethylolpropanethimethacrylate.

9 Claims, No Drawings

HEAT VULCANIZABLE POLYSILOXANE COMPOSITIONS CONTAINING ASBESTOS

BACKGROUND OF THE INVENTION

The invention relates to heat-curable polysiloxane compositions and, in particular, to heat curable polysiloxane compositions containing asbestos therein.

In prior developments, asbestos has been used as a filler in polysiloxane compositions which were then cured to produce a silicone elastomeric composition used for a variety of purposes. In these disclosures of the prior art, asbestos was not distinguished from other inorganic fillers such as calcium carbonate, and not shown to produce any new properties in the resulting composition, but only shown to add stiffness or hardness to the resulting product. However, as mentioned earlier, from the prior art it is seen that asbestos fibers, when used as a filler in polysiloxane compositions, produced on the whole inferior types of silicone rubber as compared to the silicone rubber prepared by the use of high reinforcing silica fillers. On the other hand, it was desired to use asbestos fibers as fillers in polysiloxane compositions if a polysiloxane rubber composition could be produced with high tensile strength, high tear strength, high stiffness, which compositions were still flexible and had desirable per cent of elongation, since asbestos is very cheap.

It was further desirable to obtain a polysiloxane elastomeric composition which had high heat resistance and a good service life at both high and low temperatures within the temperature range of minus 40°F up to and above 400°F. Thus, in automobiles it is desirable to have gaskets which will have high strength and remain flexible for long periods of times at temperatures as high as 400°F. On the other hand, it is also desirable that gaskets which often act as seals do not become brittle at low temperatures such as −40°F to which the mechanisms of the automobile may be exposed. It is also desirable in this respect that hoses formed from a polysiloxane composition have a high tensile strength and which retain their strength at high temperatures, as well as at very low temperatures.

Another use for elastomers which have high heat resistance, as well as remain flexible at low temperatures, is to cover electrical wires and electrical components. Since such electrical wires and electrical components are normally exposed to very high temperatures, as well as low temperatures, it is required that the material covering and protecting the wires does not degrade in strength or become brittle at high or low operating temperatures. It is also desired to have polysiloxane elastomers with high tensile strength and stiffness or hardness, high tear strength, good abrasion resistance, flexibility and the desired elongation so that such material could be used as a covering material. The present polysiloxane elastomeric compositions are sometimes lacking in sufficiently high tensile strength and hardness. To produce such polysiloxane elastomeric composition having the above properties which could be put to the uses mentioned above, it was suggested that different fillers be used or incorporated into the polysiloxane composition so that the resulting composition will have the desired properties. However, all approaches or uses of all fillers up to the present time have been found lacking in some respect or other. In other words, that is, although with the use of certain types of fillers, such as high reinforcing silica fillers in certain polysiloxane compositions, were superior in properties to other known polysiloxane compositions, these superior polysiloxane compositions were still not found to meet all the performance requirements or found not to have as high performance values as would be desired.

As mentioned previously, asbestos was considered for use as a filler in polysiloxane compositions. However, even with the use of asbestos as a filler, the elastomeric polysiloxane compositions that were obtained were found to have only low tensile strength, low tear resistance, as well as not to have a high hardness.

It is one object of the present invention to produce a heat-curable polysiloxane composition with high tensile strength and exceptionally high heat resistance at high temperatures.

It is another object of the present invention to produce a heat-curable polysiloxane composition which has good flexibility at low temperatures, as well as at high temperatures.

It is yet still another object of the present invention to produce a heat-curable polysiloxane composition having asbestos fibers therein, and having a high hardness value as well as the desired elongation.

It is yet another aim of the present invention to provide a process for producing a heat-curable polysiloxane composition which has a high tensile strength, exceptionally good heat resistance, the desired flexibility within a broad temperature range, a high hardness and the desired per cent of elongation.

These and other objects of the present invention are accomplished in accordance with the polysiloxane composition and the process for producing this polysiloxane composition set forth below.

SUMMARY OF THE INVENTION

In accordance with the present invention, there is provided a heat-vulcanizable silicone rubber composition comprising 15 to 94.75 percent by weight of an organopolysiloxane polymer having a viscosity of at least 100,000 centipoise at 25°C of the formula, $$(R)_n SiO_{4-n/2}, \qquad (1)$$

5 to 75 percent by weight of asbestos fiber and 0.25 to 10.0 percent by weight of an acrylic ester selected from the group consisting of

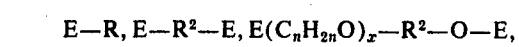

when E represents the radical,

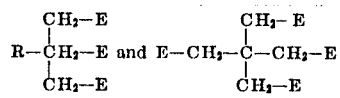

R is a radical selected from the group consisting of monovalent hydrocarbon radicals, halogenated monovalent hydrocarbon radicals and cyanoalkyl radicals, R' is a radical selected from hydrogen and the same radical as R, $R^2$ is a divalent hydrocarbon radical, a varies from 1.95 to 2.01, inclusive, n is a whole number that varies from 2 to 4 and x varies from 1 to 10. There is also included in the above composition a peroxide curing catalyst which comprises 0.1 to 8.0 percent by weight of the composition. There may also be added to this composition 10 to 60 percent by weight of the organopolysiloxane of silica filler, as a reinforcing agent. However, this silica filler is not necessarily a part of the composition. Within the weight per cent of the organopolysiloxane shown above there may also be included 1 to 25 percent by weight of the organopolysiloxane of a process aid. Within the scope of the present invention there is the process of mixing the ingredients set forth above and heating the resulting mixture to a temperature in the range of 80°C to 650°C to cure it.

DETAILED DESCRIPTION OF THE PREFERRED EMBODIMENT

The radical R represents hydrocarbon radicals, such as aryl radicals and halogenated aryl radicals such as phenyl, chlorophenyl, xylyl, tolyl, etc; aralkyl radicals, such as phenylethyl, benzyl, etc; aliphatic, haloaliphatic and cycloaliphatic, such as alkyl, alkenyl, cycloalkyl, haloalkyl, including methyl, ethyl, propyl, chlorobutyl, cyclohexyl, etc; cyanoalkyl radicals, such as cyanoethyl, cyanopropyl, cyanobutyl, etc. The radicals represented by R' are selected from the same radicals as represented by R, or hydrogen. The radicals represented by $R^2$ are alkylene and arylene radicals of two to 20 carbon atoms, such as methylene, ethylene, etc. Preferably, the radicals R and R' have eight carbon atoms or less. Of the R radicals in formula (1), at least 50 percent of the R groups are alkyl radicals and preferably methyl radicals. In addition, at least 0.1 percent by weight of the R groups in formula (1) are vinyl or represent another unsaturated alkenyl radical. However, the vinyl radical is preferred to the other alkenyl radicals. Thus, in order to obtain the preferred elastomeric composition of the present case which has the exceptional physical properties desired, it is preferred that there be a minimum of at least 0.1 percent by weight of vinyl or other alkenyl radicals attached to the silicon atom. The concentration of the vinyl or other alkenyl radicals in formula (1) may vary within the range of 0.1 to 0.6 percent by weight of the polysiloxane polymer. The R radicals in the formulas of the acrylic esters as set forth above can be any of the groups specified above. However, preferably the radicals in the acrylic ester formulas is a lower alkyl having less than eight carbon atoms and is preferably methyl. Besides the organopolysiloxane, there are two necessary ingredients in the composition of the present invention, that is, the asbestos fiber and the acrylic esters. The asbestos fibers are classified in six different categories in accordance with their basic formulas which six categories are given the name of tremolite, crystotile, crocidolite anthophyllite, amosite and actinolite. All of these types of asbestos fibers have been found to be useful in the composition of the present invention. The crystotile have been found to be superior in producing elastomeric compositions of high physical properties as compared to the other types of asbestos fiber. In particular, crystotile and crocidolite asbestos fiber produce elastomeric compositions of high tensile strength, while anthophyllite asbestos fibers produce an elastomeric composition with exceptionally high heat resistance. As a matter of fact, the tensile strength of elastomeric compositions prepared having an anthophyllite asbestos fiber therein actually improves upon heat aging. For further information as to asbestos, reference is made to the article on Asbestos by G. F. Jenkins appearing in Industrial Minerals and Rocks (Seeley W. Mudd Series), published by the American Institute of Mining, Metallurgical and Petroleum Engineers (1960). Within the general formulas of acrylic esters given above, the most preferred acrylic esters are:

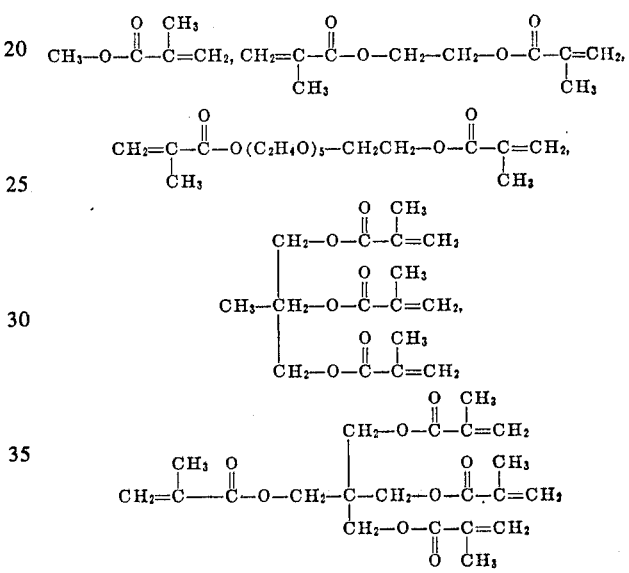

To produce acrylic esters, ethylene chlorohydrin is reacted with sodium cyanide at room temperature to produce ethylene cyanohydrin. The ethylene cyanohydrin is then reacted with methanol in the presence of 0.1 to 5 percent by weight of sulfuric acid at elevated temperatures in the range of 50° to 150°C to produce methyl acrylate. The resulting methyl acrylate may then be reacted with any saturated alcohol so that the organic group in the alcohol substitutes itself for the methyl group located on the carboxy group in the well known alcoholysis type of reaction.

In the case where R' is other than hydrogen, such as methyl, an organic compound of the formula, (2) 

is reacted with sodium cyanide at room temperature to produce the resulting cyanide product. This cyanide product is then reacted with methanol in the process of 0.1 to 5.0 percent by weight of $H_2SO_4$ at room temperature to produce methylacrylate. If desired, this may be reacted with various alcohols of the formula, $$R-OH, HO-R^2-OH,$$

$$HO-(C_nH_{2n}O)_x-R^2-OH,$$

$$R-\underset{\underset{CH_2-OH}{|}}{\overset{\overset{CH_2-OH}{|}}{C}}H_2-OH, \text{ and } HO-CH_2-\underset{\underset{CH_2-OH}{|}}{\overset{\overset{CH_2-OH}{|}}{C}}-CH_2-OH$$

The methyl acrylate is one of the preferred acrylic esters used in the present invention. However, it can also be used as an intermediate in producing other acrylic esters which come within the scope of the formulas set forth.

This methyl acrylate can be used to produce the other acrylic esters by alcoholysis. Thus, the methyl acrylate can be reacted with alcohols of the above formulas. If these alcohols are reacted with the methyl acrylate in a normal alcoholysis reaction and using the proper molar proportions of the alcohol versus the methyl acrylate, the methyl group will be substituted by the alcohol group.

The alcoholysis reaction involves mixing the two reactants in the proper molar proportions at elevated temperatures at a range of 50° to 100°C with 0.1 to 2 percent by weight of acid catalyst and allowing the mixture to remain at the elevated temperature for a period of 1 to 5 hours. During the reaction, the methanol that is formed is boiled off leaving the desired product. The catalyst which may be used is a strong acid, such as hydrochloric, sulfuric or nitric acids or, if desired, paratoluenesulfonic acid. In the alcohol formulas shown above, R and $R^2$ are as defined previously.

A more detailed presentation of forming the acrylic esters of the present case is to be found in the publication "Acrylic Esters," by Reinhold Publishing Company, 1954. In a mixture of organopolysiloxane polymer of formula (1), asbestos fiber and acrylic ester, there is generally in the mixture of 15 to 94.75 percent by weight of the polysiloxane, and preferably 50 to 94.75 percent by weight. In this mixture, there is 5 to 75 percent of asbestos filler, preferably the concentration of the asbestos fiber varies from 25 to 60 percent by weight of the mixture. As little as 5 percent asbestos fiber would have some effect on the resulting properties of the polysiloxane. At 25 percent asbestos fiber in the polysiloxane mixture there is a substantial effect on the desired physical property of the resulting composition. When the concentration of the asbestos fiber exceeds 75 percent by weight, there is too much asbestos fiber relative to organopolysiloxane and, as a result, the composition has poor physical properties. Thus, a preferable concentration of 15 to 60 percent by weight of asbestos fiber provides an organopolysiloxane with the best physical properties. With respect to the acrylic esters, there may be as little as 0.25 percent by weight of one of the acrylic esters defined above in the polysiloxane composition and this amount of acrylic ester will produce some resulting benefit in the physical properties of the resulting cured silicone rubber. It should be understood that the less asbestos fiber there is in the polysiloxane composition, the less acrylic ester is needed. Further, when there is as much as 75 percent by weight of asbestos fiber in the composition, there may be as much as 10 percent by weight of acrylic ester, based on the weight of the resulting composition. If there is more than 10 percent by weight of acrylic ester in the composition, such an excess is not needed and does not produce any desirable results. Preferably, the amount of asbestos fiber is between 25 to 60 percent of the composition. The preferable concentration for the acrylic ester is 0.25 – 5 percent by weight.

There are also within the scope of formula (1) polydiorganosiloxanes which can be copolymers containing two or more different diorganosiloxane units therein and copolymers of dimethylsiloxane units and methylphenylsiloxane units; or copolymers of methylphenylsiloxane units, diphenylsiloxane units, dimethylsiloxane units and methylvinylsiloxane units, as well as copolymers of dimethylsiloxane units, methylvinylsiloxane units and diphenylsiloxane units.

Preparation of the diorganopolysiloxane of formula (1) which can contain both saturated and olefinically unsaturated hydrocarbon groups may be carried out by any of the procedures well known to those skilled in the art. Such polysiloxanes can be produced by following a procedure involving hydrolysis of one or more hydrocarbon-substituted dichlorosilanes in which the substituents consist of saturated hydrocarbon groups to produce a crude hydrolyzate containing a mixture of linear and cyclic polysiloxanes. Further, one or more hydrocarbon-substituted dichlorosilanes whose hydrocarbon substituents comprise one or more olefinically unsaturated hydrocarbon groups are hydrolyzed to produce a crude hydrolyzate containing a mixture of linear and cyclic polysiloxanes. The two crude hydrolyzates are depolymerized by being treated with KOH to form mixtures of low boiling, low molecular weight cyclic polymers and undesirable material such as the monofunctional and trifunctional chlorosilane starting material. The resulting compositions are fractionally distilled and there is collected two pure products containing the low boiling, low molecular weight cyclic polymers free of any significant amount of monofunctional and trifunctional groups.

In order to depolymerize the crude hydrolyzates, there is added to them a catalyst and the mixture is heated at a temperature above 150°C to produce and recover by evaporation a product consisting of low molecular weight cyclic polysiloxanes comprising, for example, about 85 percent of the tetramer and 15 percent of the mixed trimer and pentamer. When the hydrocarbons on the silicon atom are methyl, materials resulting from the presence of monomethyltrichlorosilane in this initial product produced from dimethyldichlorosilane remain as residue in the distillation vessel or tower.

The distillate, consisting essentially of low molecular weight cyclic organo polymers, free of any significant amount of monofunctional and trifunctional groups, is collected in a vessel. The then dried cyclic siloxane contains less than 50 ppm of water. The cyclic dimethyl, methylvinyl and diphenyl cyclic siloxanes are prepared in the same way.

The pure cyclic siloxanes are added in the desired proportions in a reaction vessel so as to be subjected to an equilibration reaction to form the polysiloxanes of formula (1). Thus, about 1.5 – 17 mole per cent cyclic diphenylsiloxane can be added to 82 – 97.5 mole per cent dimethyl cyclic siloxanes. Then 0.1 – 1-0 mole per cent of methylvinyl cyclic siloxane may be mixed with the dimethyl and diphenyl cyclic siloxane or other desired proportions of the cyclic siloxanes may be used to produce the desired polymer. To the above mixture of pure cyclic siloxanes there is added a polymerization catalyst, such as KOH. The KOH breaks the ring of cyclic siloxanes to form a potassium silanolate which has the formula,

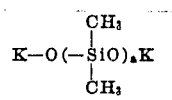

This compound, the potassium silanolate, thus can attack other cyclics to break the rings and increase the chain length of the siloxanes formed. There is further added to the reaction mixture an amount of one or more monofunctional compounds calculated to function as end-blockers for limiting the degree of polymerization and consequently the lengths and molecular weights of the linear polysiloxane chains, and for stabilizing the polymers. Usually, a small amount of monofunctional compounds are added to function as end-blockers so as to regulate the chain length of the polymers. Preferably, a compound is used as the chain-stopped groups having the formula,

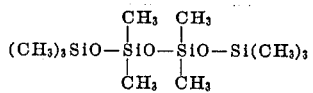

Other monofunctional compounds that may be employed satisfactorily for controlling polymer growth include, among others, hexamethyldisiloxane, tetramethyldiethoxydisiloxane, diethyltetraethoxydisiloxane and divinyltetraethoxydisiloxane.

The equilibration reaction is carried out from 2 to 4 hours until about 85 per cent of the cyclic diorganosiloxanes have been converted to polymers endstopped with monofunctional groups. When the 85 per cent conversion point has been reached, there are just as many polymers being converted to the cyclic siloxanes as there are cyclic siloxanes being converted to the polymer. At that time, there is added to the mixture a sufficient amount of an acid donor, such as phosphorous acid, that will neutralize the KOH catalyst so as to terminate the polymerization reaction. The cyclic diorganosiloxanes in the reaction mixture are then distilled off to leave the polydiorganosiloxane gum which is useful in the present invention.

Alternatively, the mixture of polydiorganosiloxane may be then further reacted with the cyclic siloxanes therein and then during compounding of the mixture with process aid and fillers on a doughmixer, the remaining cyclic siloxanes may be removed by a gas purge.

The polydiorganosiloxane is produced so that it preferably registers a penetration of 50 – 4,000 mm per minute on a standard penetrameter. Further, the polymer preferably has a molecular weight in the range of 100,000 to 2,000,000 and a viscosity of 100,000 to 100,000,000 centipoise at 25°C.

Hydrocarbon-substituted polysiloxanes whose pendant groups consist largely of groups other than methyl, such as ethyl or other saturated hydrocarbon groups and olefinically unsaturated hydrocarbon groups other than, or in addition to, vinyl groups can be produced by means of procedures similar to that described above or by means of procedures modified in accordance with the known characteristics of the various hydrocarbon groups to be included.

The polydiorganosiloxane gum employed is preferably produced under conditions so controlled as to avoid the incorporation therein of any significant amounts of trifunctional compounds, groups, or molecules to avoid crosslinking of linear polysiloxane chains through silicon and oxygen atoms and the incorporation therein of any significant amount of monofunctional compounds or radicals than those specifically provided to serve as end-blockers for limiting the degree of polymerization. Accordingly, the starting polydiorganosiloxane gum contains 2.0 hydrocarbon groups per silicon atom. Deviations from a ratio of 2 to 1, for example, ratios of 1.95 to 2.01, will be insignificant for all practical purposes since it will attribute to the presence of other hydrocarbon groups whose total numbers will be insignificant as compared with the total number of hydrocarbon groups attached to silicon atoms of linear polysiloxane chains.

In producing the silicone rubber composition of the present invention, there is utilized any of the filler materials of the highly reinforcing types consisting of inorganic compounds or any suitable combination of such filler materials employed in the production of elastomers as is customary in the prior art. There is preferably employed finely divided silica base fillers of the highly reinforcing type which are characterized by a particle diameter of less than 500 millimicrons and by surface areas of greater than 50 square meters per gram. Inorganic filler materials of a composition other than those preferred can be employed alone or in combination with the preferred fillers with good results. Such filler materials as titanium dioxide, iron oxide, aluminum oxide, as well as the inorganic filler materials known as insert fillers which can include among others, diatomaceious earth, calcium carbonate and quartz can preferably be employed in combination with highly-reinforcing silica fillers to improve the tensile strength or the hardness of the elastomeric product. Other examples of suitable fillers are diatomaceous silica, aluminum silicate, zinc oxide, zirconium silicate, barium sulfate, zinc sulfide, aluminum silicate and finely divided silica having surface-bonded alkoxy groups.

There is preferably employed in the present compositions 10 – 100 percent by weight of said polysiloxane gum of the inorganic filler and preferably 20 to 60 percent by weight.

There is also employed in the present composition 1 to 25 percent and preferably 5 to 15 percent by weight based on the polydiorganosiloxane gum of a process aid for preventing the gum and the filler mixture from structuring prior to curing and after compounding. One example of such a process aid is a compound of the formula, (3) 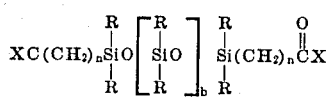

where R is a member selected from the class consisting of methyl and phenyl, X is a member selected from the class consisting of —OH, —NH$_2$ or —OR', where R' is methyl or ethyl, n has a value of from 2 to 4, inclusive, and b is a whole number equal to from 0 to 10, inclusive. Further details as to the properties, as well as the method of preparation of the compound of formula (3), are to be found in the disclosure of Martellock U.S. Pat. No. 3,464,945 which is herein incorporated by reference.

The process aid may also be a dihydrocarbon-substituted polysiloxane oil having a hydrocarbon substituent to silicon atom ratio of from 1.6 to 2.0 and whose hydrocarbon substituents comprise at least one member selected from the class consisting of methyl, ethyl, vinyl, allyl, cyclohexenyl and phenyl groups, said polysiloxane oil comprising polysiloxane molecules containing an average of from one to two lower alkoxy groups bonded to each of the terminal silicon atoms where the alkoxy groups are selected from the class consisting of methoxy, ethoxy, propoxy and butoxy.

Preparation of the alkoxy-containing hydrocarbon-substituted polysiloxane oils that can be employed as a process aid in the present invention can be carried out by producing one or more types of cyclic dihydrocarbon-substituted polysiloxanes from one or more types of dihydrocarbon-substituted dichlorosilanes and dialkoxysilanes in accordance with the hydrolysis, depolymerization and fractional distillation procedures described in detail above with reference to the preparation of the gum of formula (1). Then one or more types of cyclic siloxanes so produced are mixed with predetermined amounts of a dihydrocarbon-substituted dialkoxysilane and the mixture is subjected to an equilibration treatment under controlled conditions to produce the desired alkoxy end-blocked hydrocarbon-substituted linear polysiloxane oil.

The alkoxy-containing hydrocarbon-substituted polysiloxane oils suitable for use in the present invention are relatively low molecular weight polysiloxane oils whose polymer chains have at least four and as much as 35 and more dihydrocarbon siloxy units per molecule. The polysiloxane oils preferably have an average of at least one and not more than two alkoxy groups bonded to each of the terminal silicon atoms of the molecule. A more detailed disclosure of the alkoxy end-blocked polysiloxane process aids, as well as their method of preparation, is to be found in the disclosure of Fekete, U.S. Pat. No. 2,954,357 which is hereby incorporated into this specification by reference.

There may also be used as a process aid hydroxylated organosilanes which contain from one silicon-bonded hydroxyl per 70 silicon atoms to two silicon-bonded hydroxyls per silicon atom and contains from 1.9 to 2.1 hydrocarbon radicals per silicon atom. The remaining valences of the silicon atom are satisfied by oxygen atoms. The hydroxylated materials include both monomers such as diphenylsilanediol and polymeric materials which contain two silicon-bonded OH groups in the molecule. In addition, the hydroxylated organosilane may be a mixture of hydroxyl-containing siloxanes and completely condensed siloxanes. Irrespective of the particular composition of the hydroxylated organosiloxane, it is necessary that there be present in said organosiloxane from one OH to 70 silicon atoms to two OH per silicon atom.

The hydroxylated siloxanes may be prepared by any suitable method, such as heating said siloxanes with steam under pressure at temperatures of about 120°C or hydrolyzing silanes of the formula R$_n$SiX$_{4-n}$ where X is any hydrolyzable group such as Cl, OR, H, —OOR and R is a monovalent hydrocarbon radical. The former method is preferred for the preparation of those hydroxylated materials in which the hydrocarbon radicals are alkyl, while the latter method is best for the siloxanes in which hydrocarbon radicals are monocyclicaryl hydrocarbon radicals. Further, detailed information as to the hydroxylated organosiloxanes which may be used as process aids is to be found in Konkle et al U.S. Pat. No. 2,890,188, the disclosure of which is being incorporated into this application by reference.

Any of the above process aids may be used alone or mixtures thereof may be used in the above-defined concentrations. Further, other suitable process aids may also be used in the silicone rubber compositions of the present invention.

The curing of the silicone rubber composition of the present invention can be effected by chemical vulcanizing agents or by high energy electron radiation. More often, chemical vulcanizing agents are employed for the curing operation and any of the conventional curing agents can be employed. The preferred curing agents are organic peroxides conventionally used to cure silicone elastomers. Especially suitable are the dimethyl peroxides which may have the structural formulas,

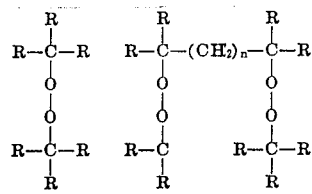

wherein R represents the same alkyl group throughout, or alkyl groups of two or more different types and n is zero or a larger integer.

Among the specific peroxide curing catalysts that are preferred are di-tertiary-butyl peroxide, tertiary-butyl-triethylmethyl peroxide, tertiary-butyl-tertiary-butyl-tertiary-triphenyl peroxide and di-tertiary alkyl peroxide such as dicumyl peroxide. Other suitable peroxide catalysts which effect curing through saturated as well as unsaturated hydrocarbon groups on the silicon chain are aryl peroxides which include benzoyl peroxides, mixed alkyl-aryl peroxides which include tertiary-butyl perbenzoate, chloroalkyl peroxides such as 1,4-dichlorobenzoyl peroxide; 2,4-dichlorobenzoyl peroxide, monochlorobenzoyl peroxide, benzoyl peroxide, etc. Generall, 0.1 – 8 percent of said peroxide, by weight of the polydiorganosiloxane gum is used to cure the silicone rubber composition and preferably 0.5 – 3.0 percent by weight.

It is found that the composition of the present case after it has been cured into a calendered sheet, can be spread to 30 percent of its longitudinal length before it breaks. However, it can be stretched to 50 percent of its transversal width before it breaks. Unexpectedly, the use of the anthophyllite asbestos fiber in the composition of the present invention produces unexpected results in this area. For instance, the use of the anthophyllite asbestos fiber in the composition of the present invention after the composition has been cured to the sheet, allows the calendered sheet to be stretched along its longitudinal direction to 50 percent elongation before it breaks. However, the same sheet can be stretched to 250 percent elongation in the transverse direction before it breaks. Thus, it can be seen that the use of asbestos fibers allow calendered and cured silicone elastomeric sheets to be stretched more in the transverse direction as compared to the longitudinal direction before the sheet is ruptured.

There also can be incorporated into the present silicone rubber composition, pigments such as titanium dioxide which may be incorporated into the composition at a concentration of 0.05 to 3 percent by weight of the organopolysiloxane. Titanium dioxide is incorporated as a pigment into the composition of the present case in order to make the cured silicone elastomeric sheets prepared therefrom impervious to light. There may also be incorporated heat stabilizers, such as iron oxides, carbon black, rare earth octoates, urethanes, etc.

There is preferred as a heat stabilizer to be incorporated into the composition 0.1 to 5 percent by weight of the organopolysiloxane of $Fe_2O_3$. In the practice of the invention, the present polysiloxane composition is produced by mixing the organopolysiloxane polymer, the silica or other types of filler and the process aid. As this mixture is formed, then the asbestos fiber, the acrylic ester of the present case and the peroxide curing catalyst are mixed into the composition. At this point there may be added the iron oxide or a pigment, such as the titanium dioxide. The order of addition of the latter ingredients is not critical, it is only important that the organopolysiloxane gum, the filler and the process aid be mixed together first before the other ingredients are added. The other ingredients, such as the peroxide curing catalysts and asbestos fiber and acrylic ester, as well as the titanium dioxide and iron compound, may then be added in whatever order is desired. The various ingredients in the mixture can be blended together by use of standard rubber mixing equipment, such as doughmixer, rubber mill, waring blender and the like. One procedure, for example, is to add the inorganic filler to the polymer gum while it is being milled, followed by the addition of the process aid and then adding the asbestos fiber, acrylic resin, peroxide curing catalyst and the other additional ingredients desired. Another procedure that can be employed is to doughmix the polymer and the inorganic filler, the process aid and the peroxide curing catalyst while it is being milled on the rubber mill and then adding the other ingredients thereafter. Those skilled in the art would know by the properties desired in the cured product and the applications to which the cured product is to be employed, and the nature and amount of the particular ingredients utilized, the manner of blending to produce the desired organopolysiloxane composition. To form the organopolysiloxane, the polymer, inorganic filler and process aid which is optional, are added in a doughmixer and after the mixture is complete, the mixture is taken and put on a mill. While it is on the mill there is added to the mixture the peroxide curing catalyst, the acrylic ester and the asbestos fiber in any desired order. The milled sheets are then cured in a manner well known in the art. The organopolysiloxane composition can be converted to the cured product by heating at temperatures in the range of 80° to 650°C, depending upon the nature of the curing catalyst, duration of cure, amount and type of filler, etc., as well as the amount of the other ingredients. The direct conversion of the polysiloxane composition to the cured product can be effected as a result of the conditions normally utilized during conventional molding, extrusion and calendering operations. For example, depending upon the curing catalyst used, the temperature from 80° to 300°C can be employed for compression and transfer molding for either 30 minutes or more or one minute or less.

Hot air curing at the temperatures of from 100° to 650°C or steam vulcanization at temperatures from 110° to 210°C can be employed from periods from 5 to 10 minutes, or a matter of seconds. The sheets can be calendered or milled first and then press-cured at 200° – 400°C for 30 seconds to 10 minutes or passed into an oven where they can be air heated to a desired temperature range of 100° to 300°C.

In order that those skilled in the art will be able to understand the practice of the present invention, the following examples are given by way of illustration and not by way of limitation. All parts are by weight.

Example 1

The high tensile strength, the high tear strength, excellent heat resistance of the compositions of the present case are especially good in the case where crysotile asbestos fibers are used in the composition of the present case, as illustrated by this example. There is mixed with 100 parts of polysiloxane polymer having the formula,

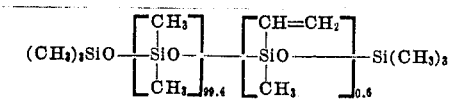

15 parts of a process aid which is methoxy-stopped and having twelve diphenyl-, dimethyl-, methylphenylsiloxy groups therein and 50 parts of silica filler to form Composition A. The above ingredients are mixed in a dough-mixer. Afterwards samples of Composition A are placed on a mill and there is milled per 100 parts of Composition A various amounts of trimethylolpropenetrimethacrylate and dicumyl peroxide. The resulting mixtures are milled into sheets which are then press-cured at a temperature of 330°F for 1 hour. After the curing period has passed, the cured rubbers are subjected to different physical tests to determine the physical properties. Different samples of the cured polysiloxane rubber sheets are then heat-aged for different periods of time and the different samples which are heat-aged for different periods of time are then tested to determine their physical properties. Furthermore, a different mixture of Composition A with the curing catalyst and a different amount of asbestos are prepared and evaluated. The results of these tests are given below in Table I.

| Ingredients | Mixture A | Mixture B |

| | | |
|---|---|---|
| Composition A | 100 | 100 |
| Crysotile Asbestos | 50 | 100 |
| Trimethylolpropane-trimethacrylate | 1.5 | 1.5 |
| Dicumyl Peroxide | 1.0 | 1.0 |

TABLE I

| | | |
|---|---|---|
| Initial, Cured 15 Minutes at 300° F | | |
| Tensile strength | 1560 | 850 |
| Elongation | 40 | 40 |
| Hardness | 87 | 90 |
| Tear Die B | 200 | 95 |
| Resilience, Bashore, % | 40 | 25 |
| Heat Aged, 18 Hours at 350° F | | |
| Tensile Strength | 1700 | 1250 |
| Elongation | 25 | 20 |
| Hardness | 90 | 90 |
| Tear Die B | 255 | 175 |
| Heat Aged, 96 Hours at 350° F | | |
| Tensile Strength | 1830 | - |
| Elongation | 25 | - |
| Hardness | 90 | - |
| Tear Die B | 245 | - |
| Heat Aged, 168 Hours at 350° F | | |
| Tensile Strength | 2260 | - |
| Elongation | 25 | - |
| Hardness | 90 | - |
| Tear Die B | 250 | - |
| Heat Aged 96 Hours at 400° F | | |
| Tensile Strength | 950 | - |
| Elongation | 15 | - |
| Hardness | 90 | - |
| Tear | 150 | - |

From these results, it is seen that Mixture A initially yields a composition with a higher tensile strength, as well as a higher percent of elongation than Mixture B, thus it is desirable to have the present composition at 50 parts rather than 100 parts of crysotile asbestos fiber per 100 parts of Composition A. It is noted that with both Mixture A and Mixture B which are heat-aged at 350°F for various periods of time, the tensile strength tends to increase as well as the tear strength and hardness. On the other hand, during the heat-aging the elongation decreases to some extent. Thus, it can be seen from the present results that the composition of the present case has excellent heat resistance at temperatures up to 350° and 400°F.

Example 2

An organopolysiloxane, filler and process aid mixture was prepared with the same ingredients and at the same concentrations as Composition A in Example 1, which will be referred to herein as Composition A. Into 100 parts of Composition A there was milled the following ingredients:

| Ingredients | Parts |
|---|---|
| Composition A | 100.0 |
| Chrysotile Asbestos Fibers | 50.0 |
| Fe₂O₃ Masterbatch | 2.0 |
| Methylacrylate | 1.5 |
| Dicumyl Peroxide | 2.0 |

The mixture was milled into a sheet, was then heat cured at 350° F for a period of 1 hour. After that, various samples were heat-aged for different periods of time. At the end of the heat-aging period, the sheets were then tested for the different physical properties to yield the results shown in Table II below.

TABLE II

Physical Properties at Various Heat Aging Temperatures and Times

| Physical Properties | 1 hour/ 350°F | 24 hours/ 300°F | 24 hours/ 350°F | 24 hours/ 400°F |
|---|---|---|---|---|
| Tensile Strength psi | 1900 | 1920 | 1950 | 1880 |
| Elongation percent | 50 | 40 | 40 | 40 |
| Durometer | 86 | 86 | 87 | 88 |
| Tear Resistance PPI | 280 | 280 | 290 | 180 |

| | 168 hrs/ 300°F | 168 hrs /350°F | 168 hrs /400°F | |
|---|---|---|---|---|
| Tensile Strength psi | 1850 | 1350 | 840 | |
| Elongation percent | 40 | 40 | 40 | |
| Durometer | 86 | 86 | 85 | |
| Tear Resistance PPI | 185 | 185 | 150 | |

The silicone rubber elastomer composition has good physical properties sufficient for the uses enumerated above to which the composition of the present case may be put to such use as gaskets and radiator hoses and other such uses.

Example 3

Although crysotile asbestos fibers were found to impart to the silicone rubber composition a higher initial tensile strength than other types of asbestos fibers, it was found that crocidolite asbestos fibers will yield polysiloxane compositions with better heat resistance. To illustrate the advantage of using crocidolite asbestos fibers in the polysiloxane composition of the present case, a mixture was prepared with such fibers and Composition A of Example 1 in the following amounts:

| INGREDIENTS | Parts |
|---|---|
| Composition A | 100.0 |
| Crocidolite Asbestos Fibers | 50.0 |
| Trimethylolpropane-trimethacrylate | 1.5 |
| Benzoyl Peroxide | 2.0 |

After both the ingredients were milled together and cured into a sheet, the sheets were then placed in an oven and cured at 350°F for 2 hours. Samples from the cured sheets were taken and heat-aged for various periods of times so as to determine the physical properties after heat-aging. The results are shown in Table III below.

TABLE III

Physical Properties On Heat-Aging

| Physical Properties | Initial | 24 hrs/ 350°F | 24 hrs/ 400°F | 24 hrs/ 480°F | 24 hrs/ 600°F |
|---|---|---|---|---|---|
| Tensile Strength | 1200 | 1440 | 1000 | 1050 | 1040 |
| Elongation | 50 | 40 | 40 | 40 | 25 |
| Durometer | 84 | 86 | 86 | 86 | 88 |
| Flexibility | Good | Good | Good | Good | Good |
| Tear Strength, Die B | 220 | 275 | 195 | 195 | 230 |

| | Initial | 7 days/ 350°F | 7 days/ 400°F | 7 days/ 480°F | 7 days/ 600°F |
|---|---|---|---|---|---|

| | | | | |
|---|---|---|---|---|
| Tensile Strength | 1350 | 1000 | 1150 | 600 |
| Elongation | 30 | 30 | 30 | 15 |
| Durometer | 87 | 88 | 88 | 88 |
| Flexibility | Good | Good | Good | Good |
| Tear Strength, Die B | 250 | 175 | 178 | 115 |

It is seen from Table III that the cured elastomeric composition has good heat resistance properties at a temperature range of 300° to 400°F. It can be appreciated from the data given in Table III that the crocidolite asbestos fibers do not increase the initial tensile strength of the cured polysiloxane composition of the present case as high as when crysolite asbestos fibers are used. However, the tensile strength, as well as the per cent elongation and tear strength do not degrade as much during heat-aging at temperatures as high as 350°F, to 400°F and even at the extreme temperatures of 600°F when crocidolite asbestos fiber is used. Thus, it is indicated by the data obtained above that if the polysiloxane elastomeric composition is to be used at an excessively high temperature, that is at about 350° or 400°F for long periods of time, then it would be highly advantageous to use crocidolite asbestos fibers in the composition of the present case. It is shown by the data that even after the silicone composition had been heat aged for 7 days at 600°F, it still had good physical properties and thus could still function for the use for which it is intended, such as high temperature gasket seals, cooling hoses or coverings for electric wires and components.

Example 4

Anthophyllite asbestos fiber, as distinguished from the other types of asbestos fibers, has the unique property that upon heat-aging, the tensile strength of the cured elastomeric composition increases. To 100 parts of Composition A of Example there were added the following ingredients:

| INGREDIENTS | Parts |
|---|---|
| Composition A | 100 |
| Anthophyllite Asbestos Fibers | 50 |
| Methylacrylate | 1.5 |
| Dicumyl Peroxide | 2.0 |

The resulting mixture of the above ingredients was milled on the mill and the sheet that was formed was then placed in the mold and press-cured for five minutes at 325°F. The physical properties of the initial cured material, as well as of samples that were heat-aged is given in Table IV below.

TABLE IV

| Physical Properties | Initial | 24 Hrs/400°F | 1 Wk/400°F |
|---|---|---|---|
| Tensile Strength psi | 680 | 900 | 1070 |
| Elongation percent | 260 | 180 | 60 |
| Durometer | 72 | 75 | 76 |
| Tear Strength | 150 | 160 | 148 |
| Flexibility | Excellent | Excellent | Excellent |

As indicated from the results above, when anthophyllite asbestos fibers are used, the tensile strength upon heat-aging improves while the durometer remains substantially the same.

Example 5

Using a polysiloxane, filler, and process aid blend prepared in accordance with Composition A of Example 1, there was prepared several samples of the composition to which samples, there were added various ingredients. After the samples were milled into sheets, the sheets were cured in a mold for 5 minutes at 325°F. The cured sheets were then tested to determine their physical properties which are given in Table V below.

TABLE V

| Ingredient | Parts | Parts | Parts | Parts | Parts | Parts |
|---|---|---|---|---|---|---|
| Composition A | 100 | 100 | 100 | 100 | 100 | 100 |
| Crysotile Asbestos Fiber | 50 | 50 | 150 | 150 | 250 | 250 |
| Trimethylolpropanetrimethylacrylate | 1.0 | | 1.0 | | 1.5 | |
| Dicumyl Peroxide | 1.0 | 1.0 | 1.0 | 1.0 | 1.0 | 1.0 |
| Physical Properties | | | | | | |
| Tensile Strength | 1100 | 635 | 1050 | Brittle | 950 | Brittle |
| Elongation | 40 | 180 | 25 | Brittle | 15 | Brittle |
| Hardness | 88 | 76 | 87 | Brittle | 90 | Brittle |
| Tear | 150 | 81 | 100 | Brittle | 100 | Brittle |

The results above amply show the advantageous increase in physical properties where the acrylic resin is used with the asbestos fiber to prepare a heat cured silicone rubber composition.

I claim:

1. A heat vulcanizable silicone rubber composition comprising (a) 15 to 94.75 percent by weight of an organopolysiloxane polymer having a viscosity of at least 100,000 centipoise at 25°C of the formula, $$(R)_n SiO_{4-n/2} \qquad (1)$$

(b) 5 to 75 percent by weight of asbestos fiber, and (c) 0.25 to 10.0 percent by weight of an acrylic ester selected from the group consisting of

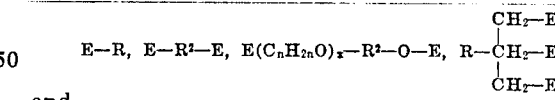

and

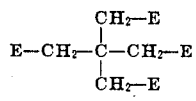

where E represents the radical

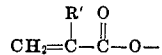

, where at least 50 percent by weight of the R radicals in Formula (1) are alkyl and at least 0.1 percent by weight of the R radicals in Formula (1) are alkenyl and the remaining R radicals in Formula (1) may be selected from the class consisting of aryl, arlakyl, cycloalkyl and cyanoalkyl, where the R radicals in the acrylic ester formulas are lower alkyl, where R' is selected from the class consisting of alkyl, aryl, alkenyl, cycloalkyl and hydrogen, $R^2$ is a divalent hydrocarbon radical and a varies from 1.95 to 2.01, inclusive, $n$ is a whole number that varies from 2 to 4 and $x$ varies from 1 to 10.

2. The composition of claim 1 further including a silica filler which comprises 10 to 60 percent by weight of the organopolysiloxane.

3. The composition of claim 2 further including 0.1 to 8 percent by weight of the organopolysiloxane of a peroxide curing catalyst.

4. The composition of claim 1 wherein there is added to the organopolysiloxane a process aid which comprises 1 to 25 percent by weight of said organopolysiloxane.

5. The composition of claim 4 wherein the process aid is a dihydrocarbon-substituted polysiloxane oil having a hydrocarbon substituent to silicon atom ratio of from 1.6 to 2.0 and where said hydrocarbon substituents comprise at least one member selected from the class consisting of methyl, ethyl, vinyl, allyl, cyclohexenyl and phenyl groups, said polysiloxane oil comprising polysiloxane molecules containing an average of from one to two lower alkoxy groups bonded to each of the terminal silicon atoms.

6. The composition of claim 1 further including 0.1 to 2 percent by weight of the composition of $Fe_2O_3$.

7. The composition of claim 1 wherein the acrylic ester is methylacrylate.

8. The composition of claim 1 wherein the acrylic ester is trimethylolpropanetrimethacrylate.

9. The composition of claim 1 wherein the asbestos fiber is selected from anthophyllite, crysotile and crocidolite.

* * * * *